United States Patent
Yamagata

(10) Patent No.: US 6,297,187 B1
(45) Date of Patent: Oct. 2, 2001

(54) CATALYST FOR IMPROVING THE PERFORMANCE OF LIQUID HYDROCARBON FUEL

(76) Inventor: Katsuyoshi Yamagata, 92-8 Minamiiwakuni-machi 2-Chome, Iwakuni-shi, Yamaguchi 740-0034 (JP)

( * ) Notice: Subject to any disclaimer, the term of this patent is extended or adjusted under 35 U.S.C. 154(b) by 0 days.

(21) Appl. No.: 09/485,788
(22) PCT Filed: Sep. 2, 1998
(86) PCT No.: PCT/JP98/03919
§ 371 Date: Feb. 16, 2000
§ 102(e) Date: Feb. 16, 2000
(87) PCT Pub. No.: WO99/65605
PCT Pub. Date: Dec. 23, 1999

(30) Foreign Application Priority Data

Jun. 18, 1998 (JP) .................................................. 10-171022

(51) Int. Cl.⁷ ................................ B01J 31/00; B01J 31/06
(52) U.S. Cl. ......................... 502/159; 502/402; 502/407; 502/409; 502/413; 502/417

(58) Field of Search ..................................... 502/159, 402, 502/407, 409, 413, 417

(56) References Cited

FOREIGN PATENT DOCUMENTS

| 5-212291 A | 8/1993 | (JP) . |
| 9-248464 A | 9/1997 | (JP) . |
| 9-290164 | 11/1997 | (JP) . |

*Primary Examiner*—Elizabeth D. Wood
(74) *Attorney, Agent, or Firm*—Merchant & Gould P.C.

(57) ABSTRACT

The present invention provides a method of making a catalyst for improving the performance of liquid hydrocarbon fuel. The treating agent for improving the performance of liquid hydrocarbon fuel is made by preparing a resin or a rubber composition having 100 parts by weight of a resin or a rubber component, 15 to 60 parts by weight of a carbon source having a particle size of not more than 0.5 mm and containing anthracite in amount not less than 62.5%, to 85 parts by weight of a silicon dioxide source having a particle size of not more 0,5 mm and containing quartz sand in an amount not less than 8-% and 5 to 15 parts by weight of glass fiber having an average fiber length of 6 to 12 μm, press molding the composition to obtain a molded article, and aging the molded article.

5 Claims, 2 Drawing Sheets

CATALYST FOR IMPROVING THE PERFORMANCE OF LIQUID HYDROCARBON FUEL

TECHNICAL FIELD

The present invention relates to a method of making a catalyst for liquid hydrocarbon fuel. More particularly, it relates to a method of making a catalyst for liquid hydrocarbon fuel, which enhances combustion efficiency of fuel in internal-combustion engines, reduces an amount of incomplete combustion materials in exhaust gas, and improves performance of internal-combustion engines.

BACKGROUND ART

Hitherto, there has been serious problem in air pollution and harmful influence on the Earth environment derived from exhaust gas of internal-combustion engines, such as an automobile. In order to lighten the problem, many methods have been proposed, for example an improvement of a structure or combustion mode of internal-combustion engines, and employment of a filter, a removal of an impurity in fuel and the like. However, some of them have made a sacrifice of the performance of the internal-combustion engines. Then, as a method to clean exhaust gas while maintaining the performance of the internal-combustion engines, methods of reducing a content of incomplete combustion materials in the exhaust gas by improving the combustion efficiency of fuel have been proposed. The methods include an elevation of a combustion temperature of fuel, a removal of an impurity during a purification step of fuel, an increase of an octane number of fuels by an addition of additives or chemical reaction, and the like. However, the methods mentioned above generally make complicate productive facilities and manufacturing process, and are not practiced with ease and at low cost.

DISCLOSURE OF INVENTION

PROBLEM TO BE SOLVED BY THE INVENTION

A main object of the present invention is to provide a method of making a catalyst for liquid hydrocarbon fuel. The catalyst improves combustion efficiency of fuel for internal-combustion engines with ease and at low cost.

MEANS FOR SOLVING THE PROBLEM

The present inventors have intensively studied to attain the above mentioned object and have found that a resin or rubber composition containing specified amounts or carbon-containing powder and silicon dioxide-containing powder is press-molded to form a catalyst which can be prepared at low cost with ease and surprisingly increases a combustion efficiency of fuel in internal-combustion engines. Thus, the present invention has been completed.

The present invention relates to a method of making a catalyst for liquid hydrocarbon fuel comprising the steps of:

(a) preparing a resin or rubber composition comprising (i) 100 parts by weight of a resin or rubber component;

(ii) 15 to 60 parts by weight of a carbon source having a particle size of not more than 0.5 mm and containing anthracite of not less than 62.5%;

(iii) 35 to 85 parts by weight of a silicon dioxide source having a particle size of not more than 0.5 mm and containing quartz sand of not less than 80 %; and (iv) 5 to 15 parts by weight of glass fiber having an average fiber length of 6 to 12 μm;

(b) press molding the composition to obtain a molded article, and (c) aging the molded article.

The present invention also relates to a method of making a catalyst for liquid hydrocarbon fuel comprising the steps of:

(a) preparing a resin or rubber composition comprising (i) 100 parts by weight of a resin or rubber component;

(ii) 15 to 60 parts by weight of a carbon source having a particle size of not more than 0.5 mm and containing anthracite of not less than 62.5%;

(iii) 35 to 85 parts by weight of a silicon dioxide source having a particle size of not more than 0.5 mm and containing quartz sand of not less than 80%;

(iv) 5 to 15 parts by weight of glass fiber having an average fiber length of 6 to 12 μm; and (v) 5 to 15 parts by weight of tungsten powder having a particle size of not more than 0.2 mm;

(b) press molding the composition to obtain a molded article, and (c) aging the molded article.

Figure 1:
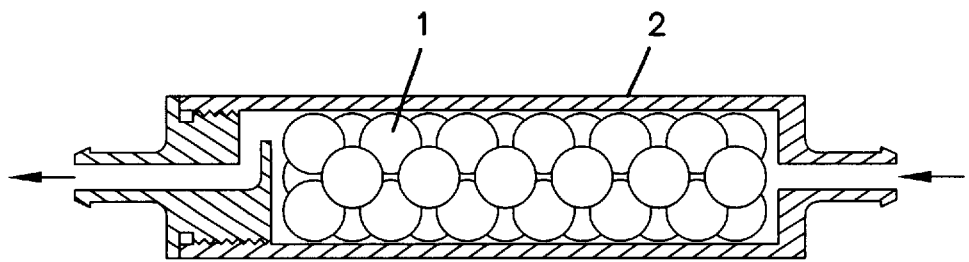
FIG. 1 is a schematic cross section illustrating one embodiment of a device containing the catalyst for liquid hydrocarbon fuel of the present invention.

The resin or rubber composition used for the present invention comprises a resin or rubber component, a carbon source, a silicon dioxide source, glass fiber and the like. The resin or rubber component used for the present invention is not limited as long as it has sufficient heat resistance to use at a temperature for working the catalyst for liquid hydrocarbon fuel of the present invention (40° to 100° C.), and it is insoluble in the liquid hydrocarbon fuel to be used. Examples of the resin or rubber component include thermosetting resins, such as phenol resin, epoxy resin, melamine resin and the like; thermoplastic resins, such as polyethylene, polypropylene, poly(vinyl chloride), polystyrene and the like; natural rubber; synthetic rubber, such as butadiene rubber, isoprene rubber, acrylic rubber, urethane rubber, silicone rubber, fluororubber and the like. Typical examples of the resin components include phenol resin "F-2410" (trade name), which is commercially available from Food Co., Ltd.; "Estar H8100", "Estar H6650PC", "Estar R-3115B" (trade name), which are commercially available from Mitsui Toatsu Chemical Co., Ltd., and the like. Typical examples of the rubber compnenets include nitrile rubber, which is commercially available from Nippon Zeon Co., Ltd. under the trade name of "Epichlorohydrin CHR", and the like.

The carbon source used for the present invention is not limited, but includes simple substance of carbon, such as diamond, graphite and the like; coal, such as anthracite, bituminous coal and the like; metallic carbonate, such as limestone, dolomite and the like; and mixtures thereof. It is required that the carbon source used for the present invention contains not less than 62.5% by weight, preferably 75 to 80% by weight of anthracite having a carbon content of not less than 90%, based on the total weight of the carbon source. When the content of the anthracite is smaller than 62.5% by weight, the content of impurities is too high and the impurities are oxidized to expand or corrode when contacting with the hydrocarbon fuel. The carbon source has a particle size of not more than 0.5 mm, preferably not more than 0.2 mm. When the particle size is larger than 0.5 mm, the surface area of the carbon source is too samll, and the technical effects accomplished by the presence of the carbon source are not sufficiently obtained. The amount of the carbon source is 15 to 60 parts by weight, preferably 30 to 41 parts by weight, based on 100 parts by weight of the resin or rubber component. When the amount of the carbon source is smaller than 15 parts by weight, the technical effects accomplished by the presence of the carbon source are not sufficiently obtained. On the other hand, the amount of the carbon source is larger than 60 parts by weight, a melting viscosity of the resin or rubber composition at the time of press molding is high, and moldability is degraded. Therefore the technical effects accomplished by the presence of the carhon source are not further obtained.

The silicon dioxide source used for the present invention includes quartz, tridymite, cristobalite, coesite, stishovite, amorphous silica, quartz sand and the like, and mixtures thereof. It is required that the silicon dioxide source used for the present invention contains not less than 80% by weight, preferable 90 to 95% by weight of quartz sand, based on the total weight of the silicon dioxide source. When the content of the quartz sand is smaller then 80% by weight, the content of impurities, such as slime, iron oxide and the like are high. The silicon dioxide source has a particle size of not more than 0.5 mm, preferably 0.3 to 0.1 mm. When the particle size of the silicon dioxide source is larger than 0.5 mm, the surface area of the silicon dioxide source is too small, and the technical effects accomplished by the presence of the silicon dioxide source are not sufficiently obtained.

The amount of the silicon dioxide source is 35 to 85 parts by weight, preferably 60 to 81 parts by weight, based on 100 parts by weight of the resin or rubber component. When the amount of the silicon dioxide sourde is smaller than 35 parts by weight, the technical effects accomplished by the presence of the silicon dioxide source are not sufficiently obtained. On the other hand, when the amount of the silicon dioxide source is larger than 85 parts by weight, the melting viscosity of the resin or rubber composition at the time of press molding is high. and the moldability is degraded. Therefore the technical effects accomplished by the presence of the silicon dioxide source are not further obtained.

The glass fiber used for the present invention may be one, which has been typically used for glass fiber reinforced plastic and the like. The glass fiber has a fiber diameter of 1 to 1.5 $\mu$m, preferably 1 to 1.2 $\mu$m, and a fiber length of 6 to 12 $\mu$m, preferably 6 to 8 $\mu$m. The amount of the glass fiber is 5 to 15 parts by weight, preferably 10 to 12 parts by weight, based on 100 parts by wieght of the resin or rubber component. When the amount of the glass fiber is smaller than 5 parts by weight, the resulting molded article does not have sufficient strength, and has chips or cracks when producing and using it. On the other hand, when the amount of the glass fiber is larger than 15 parts by weight, a weight ratio of resin or rubber component in the molded article is too low, and moldability is degraded.

In another embodiment of the present invention, the resin or rubber composition further contains tungsten powder, in addition to the components described above. The tungsten powder used for the present invention may be one having a purity content of not less than 80%, which has been commercially available for industrial use. The tungsten powder has a particle size of not more than 0.2 mm, preferably not more than 0.1 mm. When the particle size of the tungsten powder is larger than 0.2 mm, the surface area of the tungsten powder is too small, and the technical effects accomplished by the presence of the tungsten powder are not sufficiently obtained. The amount of the tungsten powder is 5 to 15 parts by weight, preferably 7 to 12 parts by weight, based on 100 parts by weight of the resin or rubber component. When the amount of the tungsten powder is smaller than 5 parts by weight, the technical effects accomplished by the presence of the tungsten powder are not sufficiently obtained. On the other hand, when the amount of the tungsten powder is larger than 15 parts by weight, the technical effects accomplished by the presence of the tungsten powder are not further obtained. In case of using a hydrocarbon fuel having a specific gravity of not less than 0.8 for the internal-combustion engine, the catalytic effects are not sufficiently obtained by using only the carbon source and silicon dioxide as a catalyst, because the temperature and consumption of the hydrocarbon fuel increase with the increase of the engine speed. The use of the tungsten powder in the resin or rubber composition compensates for the insufficiency of the catalytic effect.

The composition of the present invention may be prepared by blending the formulation components with a blender, which has been typically used for blending resin compositions and the like. In order to accomplish uniform blend, the formulation components other than the resin or rubber component may be blended in advance, and then adding the resin or rubber component thereto to blend them together. In order to improve the dispersibility of the powders and glass fiber in the resin or rubber component, the formulation components may be further mixed by a mixer such as a mixing roll, which has been typically used for the purpose in consideration of the difference in specific gravity.

Figure 2:
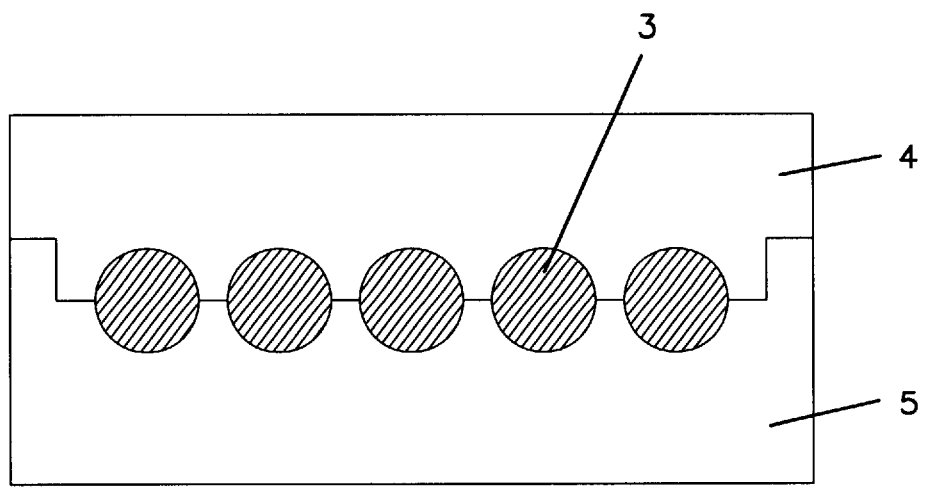
FIG. 2 is a schematic cross section illustrating one embodiment of the mold which is used for the method of making the catalyst for liquid hydrocarbon fuel of the present invention.

The composition is then molded into sphere by press molding in a mold described in FIG. 2 at 130° to 250° C. and 70 to 200 Kgf/cm$^2$ for 20 to 40 minutes, and then the molded articles are left to stand until cooling to room temperature. The press molding is conducted at the condition of 200° to 250° C., 70 to 90 Kgf/cm$^2$ for 30 to 40 minutes when using the resin component, and at the condition of 130° to 150° C. for 20 to 30 minutes under the pressure which has been typically used for molding rubber when using the rubber component. FIG. 2 is a schematic cross section illustrating one embodiment of the mold used for the method of making the catalyst for liquid hydrocarbon fuel of the present invention. The mold is composed of the upper mold 4 and the lower mold r. Optionally, about 6,000 particles of the molded articles 3 are put in a 30 liter-ball mill and milled at a number of revolution of 8 to 10 rpm for 1 to 1.5 hours without using a grinding medium for deflashing to obtain spherical molded articles having a diameter of 8.9 to 9 mm. The catalyst for liquid hydrocarbon fuel is produced by leaving the molded articles to stand at room temperature in a dark place with natural drafting for 3 to 4 weeks and then washing with water, followed by drying by sunlight for 2 to 3 days. For example, 30 to 60 particles of the resulting liquid hydrocarbon fuel catalysts 1 are put in a container 2 shown in FIG. 1 when using for the internal-combustion engine having a displacement of 2,000 to 2,500 cc, to obtain a device containing the catalyst for liquid hydrocarbon fuel of the present invention. FIG. 1 is a schematic cross section illustrating one embodiment of the device containing the catalyst for liquid hydrocarbon fuel of the present invention. Liquid hydrocarbon fuel having good combustion efficiency can be obtained with ease and at low cost by passing liquid hydrocarbon fuel through the container having the catalysts obtained by the method of the present invention. The shape of the catalyst of the present invention is preferably spherical in view of the surface area, but may be tabular or irregular.

The present invention provides a method of making a catalyst for liquid hydrocarbon fuel, which improves combustion efficiency of fuel in internal-combustion engines with ease and at low cost.

EXAMPLES

The following Examples and Comparative Examples further illustrate the present invention in detail but are not to be construed to limit the scope of the present invention.
Preparation of resin composition The following components were mixed to obtain a resin composition:

(i) 100 parts by weight of phenol resin ("F-2410" commercially available from Food Co., Ltd.)

(ii) 60 parts by weight of carbon source (content of anthracite: 70%, particle size: not more than 0.3 mm)

(iii) 75 parts by weight of silicon dioxide source (content of quartz sand: 80%, particle size: not more than 0.5 mm), and (iv) 15 parts by weight of glass fiber (fiber diameter: 1 to 1.2 μm, fiber length: 6 to 10 μm).

Production of catalyst for liquid hydrocarbon fuel

The resulting resin composition was press molded in the mold shown in FIG. w at 240° C. for 30 minutes, and Then the molded articles were left to stand until cooling to room temperature. About 6,000 particles of the resulting molded articles were put in a 30 liter-ball mill, and milled at the number of revolution of 10 rpm for 1.5 hours without using a grinding medium for deflashing, to obtain spherical resin molded articles having a diameter of 9 mm. The catalyst for liquid hydrocarbon fuel was produced by aging the molded articles at room temperature in a dark place with natural drafting for 3 weeks, and washing with water, followed by drying by sunlight for 2 days. 40 particles of the resulting liquid hydrocarbon fuel catalysts 1 were put in a container 3 shown in FIG. 1 to obtain a catalyst device for liquid hydrocarbon fuel.

EXAMPLE

A burning test of illuminating kerosine passed through the catalyst device for liquid hydrocarbon fuel was conducted. The result is shown in Table 2. After the catalyst device for liquid hydrocarbon fuel was mount on a diesel engine car and gasoline engine car (between the engine and fuel tank), the exhaust gas analysis and horsepower test of the both cars, and the combustion efficiency test of the gasoline engine car (10-mode and normal running at 60 km/h) were conducted. The results are shown in Tables 3, 4 and 5. The test methods are described later.

COMPARATIVE EXAMPLE

A burning test of illuminating kerosine, the exhaust gas analysis and horsepower test of the diesel engine car and gasoline engine car, and the combustion efficiency test of the gasoline engine car (10-mode and normal running at 60 km/h) were conducted as described in Example, except that the catalyst device for liquid hydrocarbon fuel was not used. The results are shown in Tables 2, 3, 4 and 5.

(Test method)

(1) Burning test

Figure 3:
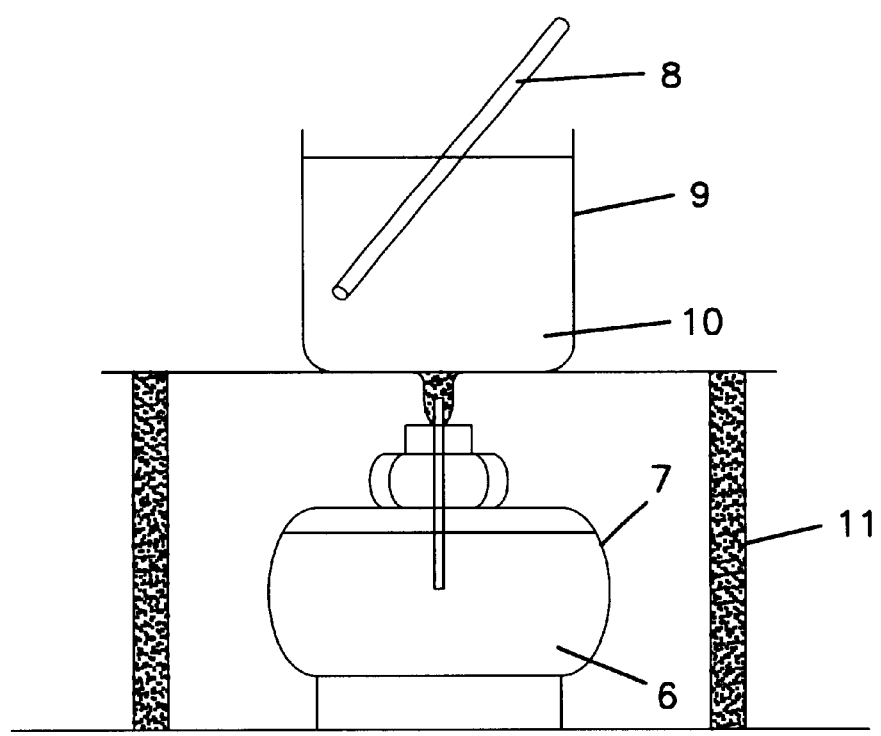
FIG. 3 is a schematic drawing illustrating a device which is used for a burning test in Examples of the present invention.

After illuminating kerosine 6 in a alcohol lamp 7 was burned for 15 minutes using a burning test device shown in FIG. 3 at a room temperature of 12° C. and water temperature of 9.5° C., an average of temperature change of tap water 10 in a beaker 9 on a chassis having legs 11 is measured using a thermometer 8 for every two samples (n=2).

(2) Exhaust gas analysis

A content of carbon oxide and hydrocarbon in exhaust gas when letting a gasoline engine idle were measured using a CO, HC analyzer, "MEXA324G" manufactured from Horiba Co., Ltd., and a content of black smoke in exhaust gas when a diesel engine was open all the way for 4 seconds in neutral gear was measured using a black smoke tester manufactured by Banzai Co. Ltd.

(3) Horsepower test

Maximum horsepowers of a gasoline engine car and diesel engine car were measured using an IYASAKA vehicle Performance Tester VFT-7048WY. The results were corrected to a value at an atmospheric pressure of 1013 mb and an atmospheric temperature of 20° C. The car used for the test is shown in Table 1.

(4) Fuel efficiency

The fuel efficiency of the gasoline engine car under the condition of 10-mode and normal running at 60 km/h. The car used for the test is shown in Table 1.

TABLE 1

| Test vehicle | | Gasoline engine car | Diesel engine car |
|---|---|---|---|
| Type of car | | Mazda Luce V6 (V-six) (E-HCFS) AT* 1889 model | Mazda Friendee Diesel Turbo (KD-SGL3) AT* 1996 model |
| Gross vehicle weight(kg) | | 1450 | 1770 |
| Dimensions of vehicle (cm) | length | 469 | 458 |
| | width | 169 | 169 |
| | height | 139 | 209 |
| Type of engine | | Gasoline | Diesel |
| Displacement (cc) | | 2000 | 2500 |
| Ignition type | | Normal ignition | Normal ignition |
| Wheelbase (cm) | | 2710 | 2910 |

*Automatic transmission

TABLE 2

| Test item | Example | Comparative Example |
|---|---|---|
| Water temperature before burning (° C.) | 9.5 | 9.5 |
| Water temperature after burning (° C.) | 86.5 | 67.0 |
| Difference in the temperature (° C.) | 77.0 | 57.5 |

TABLE 3

| | Diesel engine car | | Gasoline engine car | |
|---|---|---|---|---|
| Test item | Example | Comparative Example | Example | Comparative Example |
| Content of CO (%) | — | — | 0 | 0.05 |
| Content of | — | — | 18 | 65 |

TABLE 3-continued

| | Diesel engine car | | Gasoline engine car | |
|---|---|---|---|---|
| Test item | Example | Comparative Example | Example | Comparative Example |
| HC (ppm) Content of black smoke (%) | 32.0 | 32.7 | — | — |

TABLE 4

| | Diesel engine car | | Gasoline engine car | |
|---|---|---|---|---|
| Test item | Example | Comparative Example | Example | Comparative Example |
| Maximum horsepower (hp) | 107.0 | 101.0 | 112.0 | 99.0 |
| Vehicle velocity at maximum horsepower (km/h) | 102.0 | 92.0 | 99.0 | 99.0 |
| Engine speed at maximum horsepower (rpm) | 1 | 1 | 1 | 1 |

TABLE 5

| Test item | Example | Comparative Example |
|---|---|---|
| (10-mode) | | |
| Running time (sec) | 134.9 | 134.9 |
| Running distance (m) | 688 | 684 |
| Fuel Consumption (ml) | 94 | 121 |
| Average fuel consumption ratio (km/l) | 7.32 | 5.65 |
| (Normal running at 60 km/h) | | |
| Average vehicle velocity (km/h) | 62.1 | 61.9 |
| Average load (kg) | 21.4 | 24.1 |
| Running distance (m) | 3001 | 3003 |
| Fuel Consumption (ml) | 262 | 314 |
| Average fuel consumption ratio (km/l) | 11.45 | 9.56 |

As is apparent from the results described above, the liquid hydrocarbon fuel of Example passed through the liquid hydrocarbon fuel catalyst device of the present invention has large increase of a temperature of tap water in the burning test when compared with that of Comparative Example which is not passed through the devide, and the combustion efficiency is improved. The liquid hydrocarbon fuel of Example has lower content of carbon oxide and hydrocarbon in exhaust gas from the gasoline engine car, and lower content of black smoke in exhaust gas from the diesel engine car than that of Comparative Example.

In the performance of the internal-combustion engine, the maximum horsepower of both gasoline and diesel engine car are large, and the fuel efficiency of the gasoline engine car increases, by using the liquid hydrocarbon fuel catalyst of the present invention.

It is apparent that the combustion efficiency of the liquid hydrocarbon fuel is improved, and the content of incomplete combustion materials in exhaust gas reduces, by using the liquid hydrocarbon fuel catalyst of the present invention, which improves the performance of the internal-combustion engine.

EFFECT OF INVENTION

The combustion efficiency of the liquid hydrocarbon fuel increases, and the content of incomplete combustion materials in the exhaust gas reduces, by using the liquid hydrocarbon fuel catalyst obtained using the method of the present invention, thus improving performance of internal-combustion engines.

What is claimed is:

1. A method of making a catalyst improving the performance of liquid hydrocarbon fuel comprising the steps of:
   (a) preparing a resin or rubber composition comprising
      (i) 100 parts by weight of a resin or rubber component;
      (ii) 15 to 60 parts by weight of a carbon source having a particle size of not more than 0.5 mm and containing anthracite in an amount not less than 62.5%;
      (ii) 35 to 85 parts by weight of a silicon dioxide source having a particle size of not more than 0.5 mm and containing quartz sand in an amount not less than 80%; and
      (iv) 5 to 15 parts by weight of glass fiber having an average length of 6 to 12 $\mu$m;
   (b) press moding the composition to obtain a molded article, and
   (c) aging the molded article.

2. The method of making a catalyst for improving the performance of liquid hydrocarbon fuel according to claim 1, wherein the composition further comprises 5 to 15 parts by weight of tungsten powder having a particle size of not more than 0.2 mm, based on 100 parts by weight of the resin or rubber component.

3. The method of making a catalyst for improving the performance of liquid hydrocarbon fuel according to claim 1, wherein the step (a) of preparing the composition is conducted by mixing the components (ii), (iii) and (iv), and then adding the component (i) thereto and mixing.

4. The method of making a catalyst for improving the performance of liquid hydrocarbon fuel according to claim 1, wherein the press molding step (b) is conducted at 130° to 250° C. for 20 to 40 minutes.

5. The method of making a catalyst for improving the performance of liquid hydrocarbon fuel according to claim 1, wherein the aging step (c) is conducted by letting the molded article stand at room temperature in a dark place under normal atmospheric conditions for 3 to 4 weeks, and then washing with water, followed by drying in sunlight for 2 to 3 days.

* * * * *